United States Patent
Wu et al.

(10) Patent No.: US 8,194,198 B2
(45) Date of Patent: Jun. 5, 2012

(54) LIQUID CRYSTAL PANEL HAVING NOTCHES FOR REPAIR

(75) Inventors: Hong-Gi Wu, Miao-Li (TW); Chien-Ting Lai, Miao-Li (TW)

(73) Assignee: Chimei Innolux Corporation, Miaoli County (TW)

( * ) Notice: Subject to any disclaimer, the term of this patent is extended or adjusted under 35 U.S.C. 154(b) by 291 days.

(21) Appl. No.: 12/231,805

(22) Filed: Sep. 5, 2008

(65) Prior Publication Data

US 2009/0066869 A1 Mar. 12, 2009

(30) Foreign Application Priority Data

Sep. 7, 2007 (CN) .......................... 2007 1 0077013

(51) Int. Cl.
*G02F 1/1343* (2006.01)
(52) U.S. Cl. .......................................... 349/39; 349/38
(58) Field of Classification Search ............. 349/38, 349/39
See application file for complete search history.

(56) References Cited

U.S. PATENT DOCUMENTS

| | | | | |
|---|---|---|---|---|
| 5,247,289 A | * | 9/1993 | Matsueda | 345/98 |
| 6,441,401 B1 | * | 8/2002 | Jung et al. | 257/72 |
| 6,657,231 B2 | * | 12/2003 | Jung et al. | 257/72 |
| 6,809,335 B2 | * | 10/2004 | Park | 257/59 |
| 7,116,393 B2 | * | 10/2006 | Lee | 349/192 |
| 7,291,860 B2 | * | 11/2007 | Jung et al. | 257/59 |
| 7,576,823 B2 | * | 8/2009 | Kang et al. | 349/141 |
| 7,733,456 B2 | * | 6/2010 | Lee et al. | 349/152 |
| 7,787,068 B2 | * | 8/2010 | Choi et al. | 349/54 |
| 2002/0149020 A1 | * | 10/2002 | Jung et al. | 257/72 |
| 2003/0107039 A1 | * | 6/2003 | Jung et al. | 257/72 |
| 2004/0090566 A1 | * | 5/2004 | Jung et al. | 349/43 |
| 2004/0174484 A1 | * | 9/2004 | Matsumoto | 349/139 |
| 2004/0257509 A1 | * | 12/2004 | Lee et al. | 349/139 |
| 2007/0002251 A1 | * | 1/2007 | Chang et al. | 349/141 |
| 2008/0158465 A1 | * | 7/2008 | Choi et al. | 349/54 |

FOREIGN PATENT DOCUMENTS

| | | | |
|---|---|---|---|
| JP | 2007-199436 A | | 8/2007 |
| TW | 200538833 A | | 12/2005 |

* cited by examiner

*Primary Examiner* — K. Cyrus Kianni
(74) *Attorney, Agent, or Firm* — Li & Cai Intellectual Property (USA) Office

(57) ABSTRACT

A liquid crystal panel of the present disclosure includes a first common electrode defining a plurality of first common electrode portions, a plurality of second common electrode portions connected to the first common electrode, and a plurality of pixel electrodes. Each pixel electrode overlaps one of the first common electrode portions and a corresponding one of the second common electrode portions, thereby forming storage capacitors therebetween. Each second common electrode portion defines a first notch adjacent to the pixel electrode. There is no overlap between the pixel electrode and the second common electrode portion at the first notch.

6 Claims, 3 Drawing Sheets

LIQUID CRYSTAL PANEL HAVING NOTCHES FOR REPAIR

BACKGROUND

1. Field of the Invention

Embodiments of the present disclosure relate to a liquid crystal panel.

2. General Background

A typical liquid crystal display (LCD) is capable of displaying a clear and sharp image through thousands or even millions of pixels that make up the complete image. The liquid crystal display has thus been applied to various electronic equipment in which messages or pictures need to be displayed, such as mobile phones and notebook computers. A liquid crystal display generally includes a liquid crystal panel for displaying images, and a backlight for illuminating the liquid crystal panel.

In a process of fabricating the liquid crystal panel of the LCD, if an active substrate of the liquid crystal panel is not even enough, or when a heating or etching step is performed, a short circuit is liable to occur between a common electrode and a pixel electrode. In order to increase yield, the short circuit needs to be repaired.

However, when cutting one of the common and pixel electrodes to repair the short circuit therebetween, the common and pixel electrodes may both be inadvertently cut at the same time, thus creating another short circuit between the common and pixel electrodes. That is, the success rate of the repair process is apt to be low.

From the foregoing, it should be appreciated that there is a need for a liquid crystal display panel having an improved rate of success of repair.

SUMMARY

In one aspect, a liquid crystal panel includes a first common electrode defining a plurality of first common electrode portions, a plurality of second common electrode portions connected to the first common electrode, and a plurality of pixel electrodes. Each pixel electrode overlaps one of the first common electrode portions and a corresponding one of the second common electrode portions, thereby forming storage capacitors therebetween. Each second common electrode portion defines a first notch adjacent to the pixel electrode. There is no overlap between the pixel electrode and the second common electrode portion at the first notch.

In another aspect, a liquid crystal panel includes a first common electrode, a plurality of second common electrodes connected to the first common electrode, and a plurality of pixel electrodes. The pixel electrodes overlap respective portions of the first common electrode and the second common electrodes respectively, thereby forming storage capacitors therebetween. Each pixel electrode defines a first notch adjacent to a corresponding second common electrode with there being no overlap between the pixel electrode and the second common electrode at the first notch.

These and other objects and advantages of the present disclosure will become more apparent from the following description of certain inventive embodiments taken in conjunction with the accompanying drawings.

DETAILED DESCRIPTION

Figure 1:
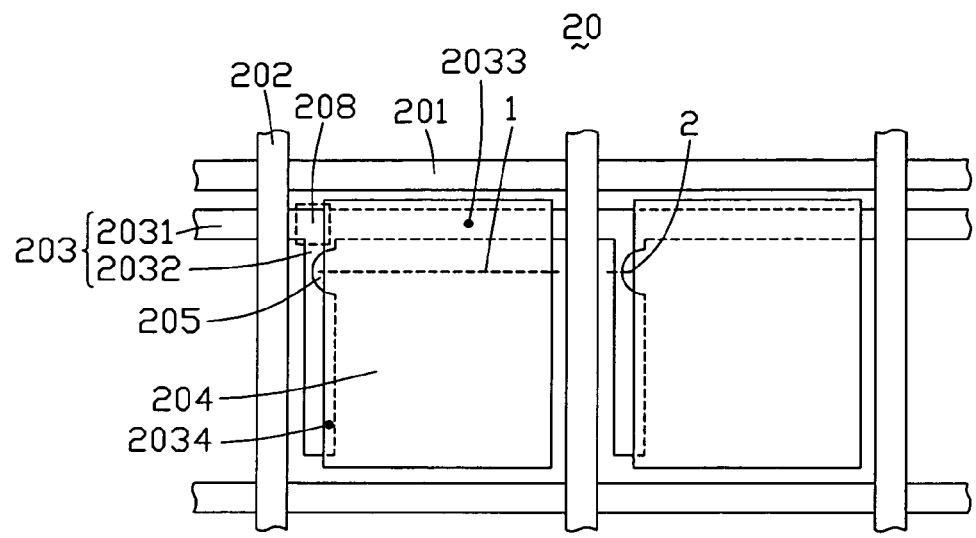
FIG. 1 is a schematic of two adjacent pixels of a liquid crystal panel according to a first embodiment of the present disclosure.

FIG. 1 is a schematic of two adjacent pixels of a liquid crystal panel 20 according to a first embodiment of the present disclosure. In this embodiment, the liquid crystal panel 20 may include a plurality of parallel gate lines 201, a plurality of parallel data lines 202 that are orthogonal to the gate lines 201, a plurality of common electrodes 203, and a plurality of pixel electrodes 204. The plurality of gate lines 201 and the plurality of data lines 202 define a plurality of pixels (not labeled). The plurality of pixel electrodes 204 are positioned in the pixels, respectively. In each pixel, the common electrode 203 may include a first common electrode portion 2031 and a second common electrode portion 2032 perpendicular to the first common electrode portion 2031. The first common electrode portion 2031 is parallel to the gate lines 201, and the second common electrode portion 2032 is parallel to the data lines 202. In each row of pixels, the first common electrode portions 2031 cooperatively form a single first common electrode (not labeled), which runs through the row of pixels. The second common electrode portions 2032 are electrically connected with the first common electrode at connection points 208, respectively.

In each pixel, the pixel electrode 204 partially overlaps the first common electrode portion 2031 and the second common electrode portion 2032, thereby forming a storage capacitor therebetween. The second common electrode portion 2032 defines a notch 205 adjacent to the connection point 208 and the pixel electrode 204. Thus, there is no overlap between the pixel electrode 204 and the second common electrode portion 2032 at the notch 205. In the illustrated embodiment, the notch 205 is semicircular or in the shape of a segment on a chord.

When a first short circuit point 2033 between the pixel electrode 204 and the first common electrode portion 2031 is detected, the pixel electrode 204 and the first common electrode portion 2031 can be disconnected by means of cutting the pixel electrode 204 along a cutting line 1 which corresponds to the notch 205.

When a second short circuit point 2034 between the pixel electrode 204 and the second common electrode portion 2032 is detected, the pixel electrode 204 and the second common electrode portion 2032 can be disconnected by means of cutting the second common electrode portion 2032 along a cutting line 2 which corresponds to the notch 205.

In summary, in each pixel, there is no overlap between the pixel electrode 204 and the second common electrode portion 2032 at the notch 205, and the cutting lines 1, 2 both correspond to the notch 205. When cutting the pixel electrode 204 or the second common electrode portion 2032 along the cutting line 1 or 2 to solve the respective short circuit problem, only one of the pixel electrode 204 and the second common electrode portion 2032 is cut. Therefore, there is little or no risk of another short circuit being created. Therefore, the rate of success of repair of the liquid crystal panel 20 is improved.

Figure 2:
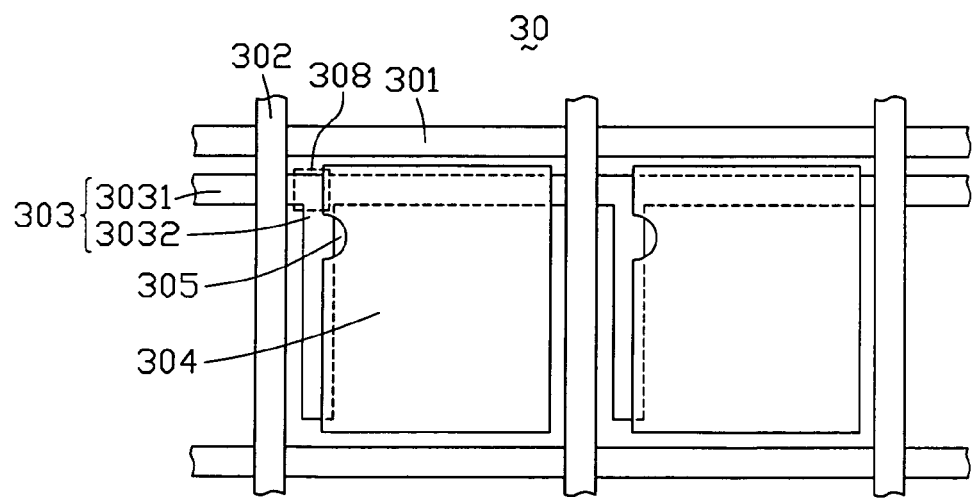
FIG. 2 is a schematic of two adjacent pixels of a liquid crystal panel according to a second embodiment of the present disclosure.

FIG. 2 is a schematic of two adjacent pixels of a liquid crystal panel 30 according to a second embodiment of the present disclosure. In this embodiment, the liquid crystal panel 30 may include a plurality of parallel gate lines 301, a plurality of parallel data lines 302 that are orthogonal to the gate lines 301, a plurality of common electrodes 303, and a plurality of pixel electrodes 304. The plurality of gate lines 301 and the plurality of data lines 302 define a plurality of pixels (not labeled). The plurality of pixel electrodes 304 are positioned in the pixels, respectively. In each pixel, the common electrode 203 may include a first common electrode portion 3031, and a second common electrode portion 3032 perpendicular to the first common electrode portion 3031. The first common electrode portion 3031 is parallel to the gate lines 301, and the second common electrode portion 3032 is parallel to the data lines 302. In each row of pixels, the first common electrode portions 3031 cooperatively form a single first common electrode (not labeled), which runs through the row of pixels. The second common electrode portions 3032 are electrically connected with the first common electrode at connection points 308, respectively.

In each pixel, the pixel electrode 304 partially overlaps the first common electrode portion 2031 and the second common electrode portion 2032, thereby respectively forming a storage capacitor therebetween. The pixel electrode 304 defines a notch 305 adjacent to the connection point 308 and the second common electrode portion 3032. Thus, there is no overlap between the pixel electrode 304 and the second common electrode portion 3032 at the notch 305. In the illustrated embodiment, the notch 305 is semicircular or in the shape of a segment on a chord.

Figure 3:
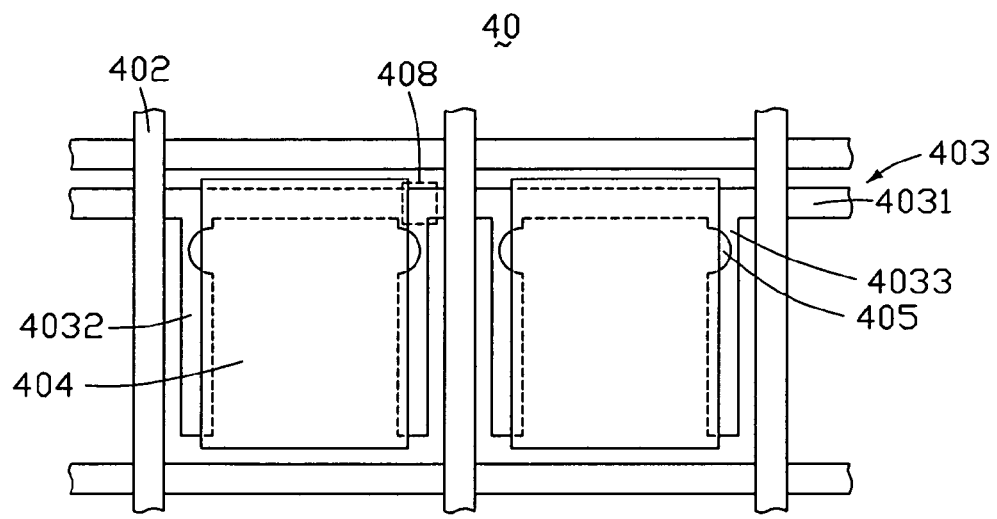
FIG. 3 is a schematic of two adjacent pixels of a liquid crystal panel according to a third embodiment of the present disclosure.

FIG. 3 is a schematic of two adjacent pixels of a liquid crystal panel 40 according to a third embodiment of the present disclosure. The liquid crystal panel 40 is similar to the liquid crystal panel 20 of the first embodiment. However, a common electrode 403 in each pixel of the liquid crystal panel 40 further includes a third common electrode portion 4033. In each pixel, the third common electrode portion 4033 is electrically connected with a first common electrode portion 4031 of a common electrode 403 at a connection point 408. The pixel electrode 404 partially overlaps the third common electrode portion 4033, thereby forming a storage capacitor therebetween. The third common electrode portion 4033 defines a notch 405 adjacent to the connection point 408 and the pixel electrode 404. Thus, there is no overlap between the pixel electrode 404 and the third common electrode portion 4033 at the notch 405. The third common electrode portion 4033 and the second common electrode portion 4032 are symmetrically opposite each other across a width of the pixel. In the illustrated embodiment, the notch 405 is semicircular or in the shape of a segment on a chord.

Figure 4:
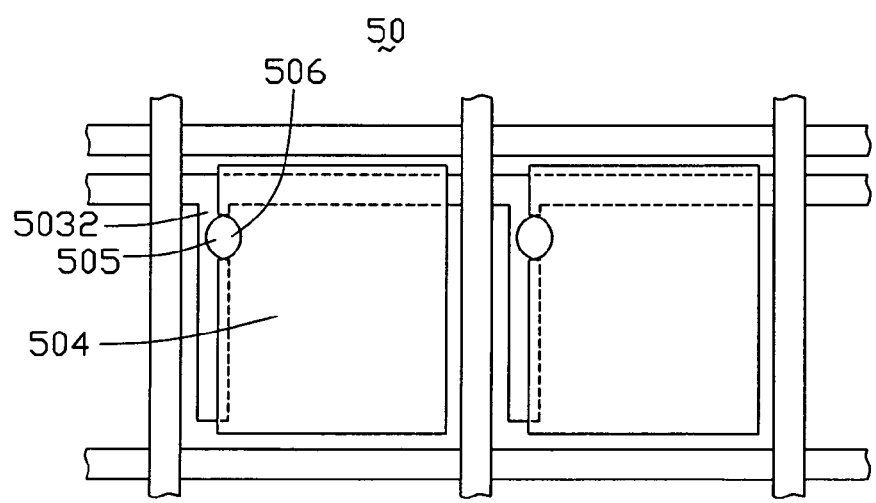
FIG. 4 is a schematic of two adjacent pixels of a liquid crystal panel according to a fourth embodiment of the present disclosure.

FIG. 4 is a schematic of two adjacent pixels of a liquid crystal panel 50 according to a fourth embodiment of the present disclosure. The liquid crystal panel 50 is similar to the liquid crystal panel 20 of the first embodiment. However, a pixel electrode 504 in each pixel of the liquid crystal panel 50 includes a notch 506 corresponding to a notch 505 of a corresponding second common electrode portion 5032. In the illustrated embodiment, each of the notches 505, 506 is semicircular or in the shape of a segment on a chord.

Figure 5:
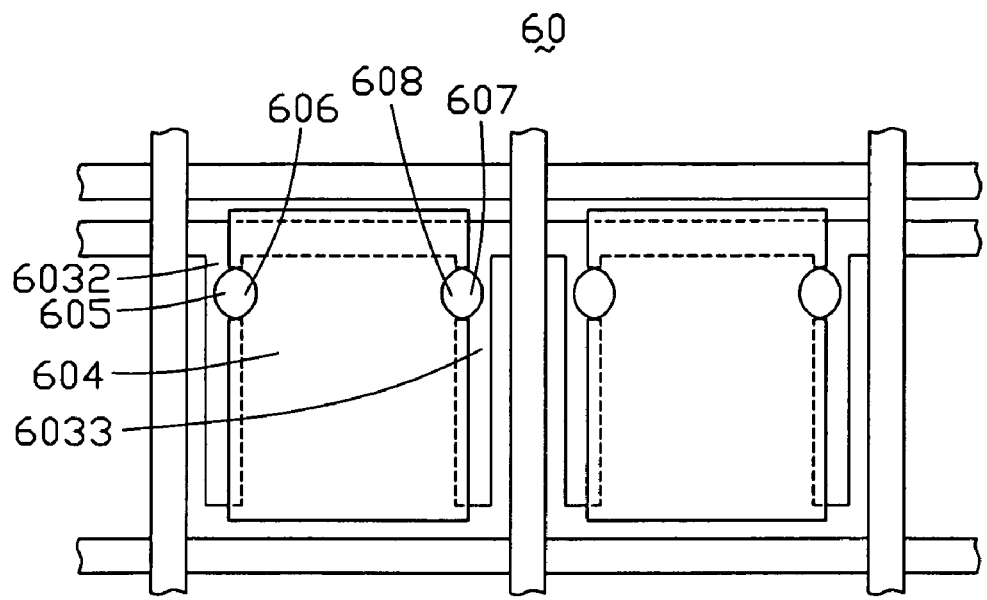
FIG. 5 is a schematic of two adjacent pixels of a liquid crystal panel according to a fifth embodiment of the present disclosure.

FIG. 5 is a schematic of two adjacent pixels of a liquid crystal panel 60 according to a fifth embodiment of the present disclosure. The liquid crystal panel 60 is similar to the liquid crystal panel 40 of the third embodiment. However, a pixel electrode 604 in each pixel of the liquid crystal panel 60 defines two notches 606, 608 at two opposite sides adjacent to a second common electrode portion 6032 and a third common electrode portion 6033, respectively. The notches 606, 608 respectively correspond to notches 605, 607 of the second and third common electrode portions 6032, 6033. In the illustrated embodiment, each of the notches 605, 606, 607, 608 is semicircular or in the shape of a segment on a chord. In one alternative embodiment, the notch 608 of the pixel electrode 604 may be omitted.

Figure 6:
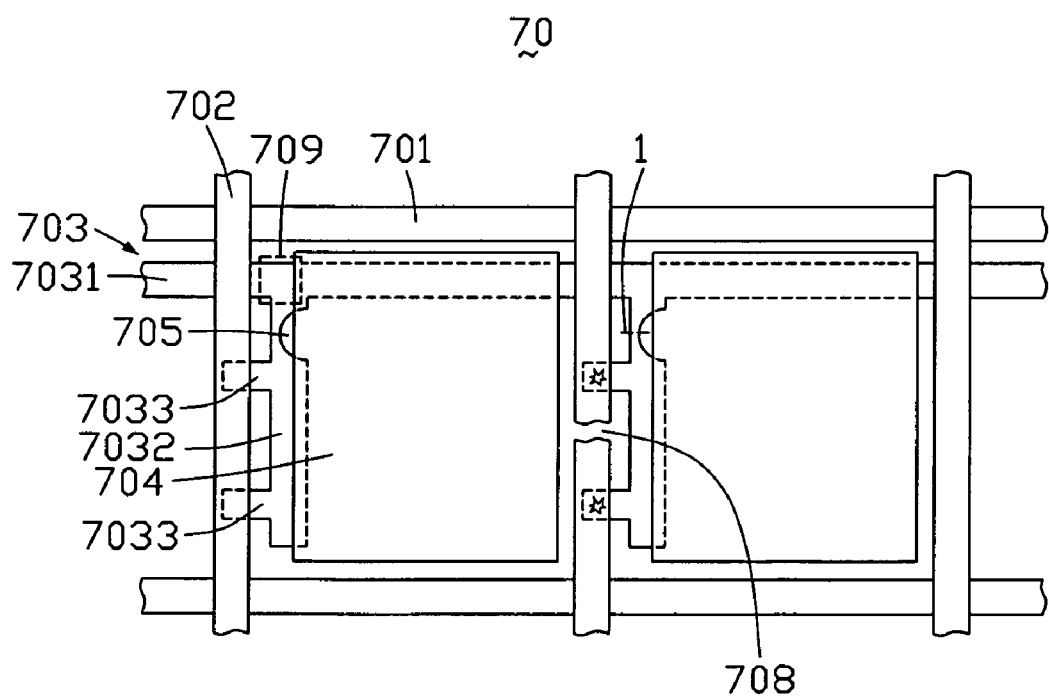
FIG. 6 is a schematic of two adjacent pixels of a liquid crystal panel according to a sixth embodiment of the present disclosure.

FIG. 6 is a schematic of two adjacent pixels of a liquid crystal panel 70 according to a sixth embodiment of the present disclosure. In this embodiment, the liquid crystal panel 70 may include a plurality of parallel gate lines 701, a plurality of parallel data lines 702 that are orthogonal to the gate lines 701, a plurality of common electrodes 703, and a plurality of pixel electrodes 704. The plurality of gate lines 701 and the plurality of data lines 702 define a plurality of pixels (not labeled). The plurality of pixel electrodes 704 are positioned in the pixels, respectively. In each pixel, the common electrode 703 may include a first common electrode portion 7031, and a second common electrode portion 7032 perpendicular to the first common electrode portion 7031. The first common electrode portion 7031 is parallel to the gate lines 701, and the second common electrode portion 7032 is parallel to the data lines 702. In each row of pixels, the first common electrode portions 7031 cooperatively form a single first common electrode (not labeled), which runs through the row of pixels. The second common electrode portions 7032 are electrically connected with the first common electrode at connection points 709, respectively.

In each pixel, the pixel electrode 704 partially overlaps the first common electrode portion 7031 and the second common electrode portion 7032, thereby respectively forming a storage capacitor therebetween. The second common electrode portion 7032 defines a notch 705 adjacent to the connection point 709 and the pixel electrode 704. Thus, there is no overlap between the pixel electrode 704 and the second common electrode portion 7032 at the notch 705. The second common electrode portion 7032 further includes two protrusions 7033 perpendicularly extending in a same direction to an underside of the nearest adjacent data line 702. One of the protrusions 7033 is relatively near the connection point 709, and the other protrusion 7033 is far away from the connection point 709.

When a break 708 in the data line 702 is detected, the two protrusions 7033 are connected to the data line 702 respectively by a welding method, and the second common electrode portion 7032 is cut along a cutting line 1 at the notch 709. Accordingly, the two separated parts of the data line 702 are reconnected through a portion of the second common electrode portion 7032, and therefore the data line 702 can work normally.

It is to be further understood that even though numerous characteristics and advantages of the present embodiments have been set out in the foregoing description, together with details of the structures and functions of the embodiments, the disclosure is illustrative only; and that changes may be made in detail, especially in matters of shape, size and arrangement of parts within the principles of the invention to the full extent indicated by the broad general meaning of the terms in which the appended claims are expressed.

What is claimed is:
1. A liquid crystal panel comprising:
a plurality of gate lines parallel to each other; and a plurality of data lines parallel to each other and extending perpendicular to the gate lines, the gate lines and data lines thereby defining a plurality of pixel regions, each pixel region comprising:
a common electrode comprising a first common electrode portion substantially parallel to the gate lines and a second common electrode portion substantially parallel to the data lines, the second common electrode portion electrically connected to the first common electrode portion; and
a pixel electrode; wherein the second common electrode portion comprises a first inner boundary adjacent to a corresponding data line and a first outer boundary opposite to the first inner boundary and adjacent to the pixel electrode, a portion of the first outer boundary is convex towards the first inner boundary such that a distance between the first inner boundary and the first outer boundary is at its narrowest at the convex portion, the pixel electrode overlaps the first common electrode portion and the second common electrode portion, thereby forming storage capacitors therebetween, and there is no overlap between the pixel electrode and the convex portion of the first outer boundary of the second common electrode portion.

2. The liquid crystal panel in claim 1, wherein the pixel electrode comprises a second inner boundary adjacent to the second common electrode portion and a second outer boundary opposite to the second inner boundary, a portion of the second inner boundary is convex towards the second outer boundary to allow the pixel electrode to have a narrower distance between the second inner boundary and the second outer boundary at the convex portion of the second inner boundary than a distance between the second inner boundary and the second outer boundary at other portions of the second inner boundary, the convex portion of the second inner boundary corresponding to the convex portion of the first outer boundary.

3. The liquid crystal panel in claim 2, wherein the second common electrode portion is connected with the first common electrode portion at a first connection point, the first convex portion being adjacent to the first connection point.

4. The liquid crystal panel in claim 3, wherein in each pixel, the common electrode further comprises a third common electrode portion, the third common electrode portion being connected with the first common electrode portion at a second connection point, the third common electrode portion and the second common electrode portion being symmetrically opposite each other across a width of the pixel, the pixel electrode overlapping the third common electrode portion thereby forming a storage capacitor therebetween.

5. The liquid crystal panel in claim 4, wherein the third common electrode portion comprises a third inner boundary adjacent to the second common electrode portion and a third outer boundary opposite to the third inner boundary, a portion of the third inner boundary is convex towards the third outer boundary to allow the third common electrode portion to have a narrower distance between the third inner boundary and the third outer boundary at the convex portion of the third inner boundary than a distance between the third inner boundary and the third outer boundary at other portions of the third inner boundary, with there being no overlap between the pixel electrode and the convex portion of the third inner boundary of the third common electrode portion.

6. The liquid crystal panel in claim 5, wherein a portion of the second outer boundary is convex towards the second inner boundary to allow the pixel electrode to have a narrower distance between the second inner boundary and the second-outer boundary at the convex portion of the second outer boundary than a distance between the second inner boundary and the second outer boundary at other portions of the second outer boundary without the convex portion, the convex portion of the second outer boundary corresponding to the convex portion of the third inner boundary.

* * * * *